July 17, 1951    H. A. SCHURICHT    2,560,991
VARIABLE-SPEED DRIVE

Filed Oct. 16, 1944    3 Sheets-Sheet 1

INVENTOR
Henry A. Schuricht
BY John Flam
ATTORNEY

July 17, 1951  H. A. SCHURICHT  2,560,991
VARIABLE-SPEED DRIVE
Filed Oct. 16, 1944  3 Sheets-Sheet 2

INVENTOR
Henry A. Schuricht
BY John Flann
ATTORNEY

July 17, 1951    H. A. SCHURICHT    2,560,991
VARIABLE-SPEED DRIVE

Filed Oct. 16, 1944    3 Sheets-Sheet 3

INVENTOR
Henry A. Schuricht
BY John Flam
ATTORNEY

Patented July 17, 1951

2,560,991

UNITED STATES PATENT OFFICE 2,560,991

VARIABLE-SPEED DRIVE

Henry A. Schuricht, Maywood, Calif., assignor to Whizzer Motor Company, Inc., Pontiac, Mich., a corporation of Delaware Application October 16, 1944, Serial No. 558,865

7 Claims. (Cl. 74—217)

This invention relates to a drive mechanism, especially adapted to be used for operating bicycles.

More particularly, the invention relates to the use of a drive mechanism which, together with a prime mover, (such as a gasoline engine) is intended for installation on a bicycle.

It is one of the objects of this invention to provide a simple and inexpensive mechanism of this character.

It is another object of this invention to provide a compact power drive that can be readily installed and that may be optionally utilized as desired by the rider who may, if he chooses, drive the bicycle either by the pedals or by the power drive.

An example of the power drive that may incorporate the invention is a belt drive in operative relation to pulleys.

It is another object of this invention to utilize a drive of this character to clutch and unclutch the drive by appropriately varying the center distance between the axes of the driving and driven pulleys.

It is another object of this invention to make it possible to utilize this type of drive not only as a clutch between the bicycle and the engine, but also, by belt tension variation, to adjust the speed ratio of the drive.

It is still another object of this invention to provide a simple and inexpensive pulley structure that may be readily attached to a wheel of a vehicle to be driven, such as the rear wheel of a bicycle.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Fig. 7 is a fragmentary sectional view, taken along plane 7—7 of Fig. 2;

Fig. 8 is a view taken along plane 8—8 of Fig. 7; and

Fig. 9 is a partial, sectional view, the section being taken to conform with the line 9—9 of Fig. 8.

Figure 1:
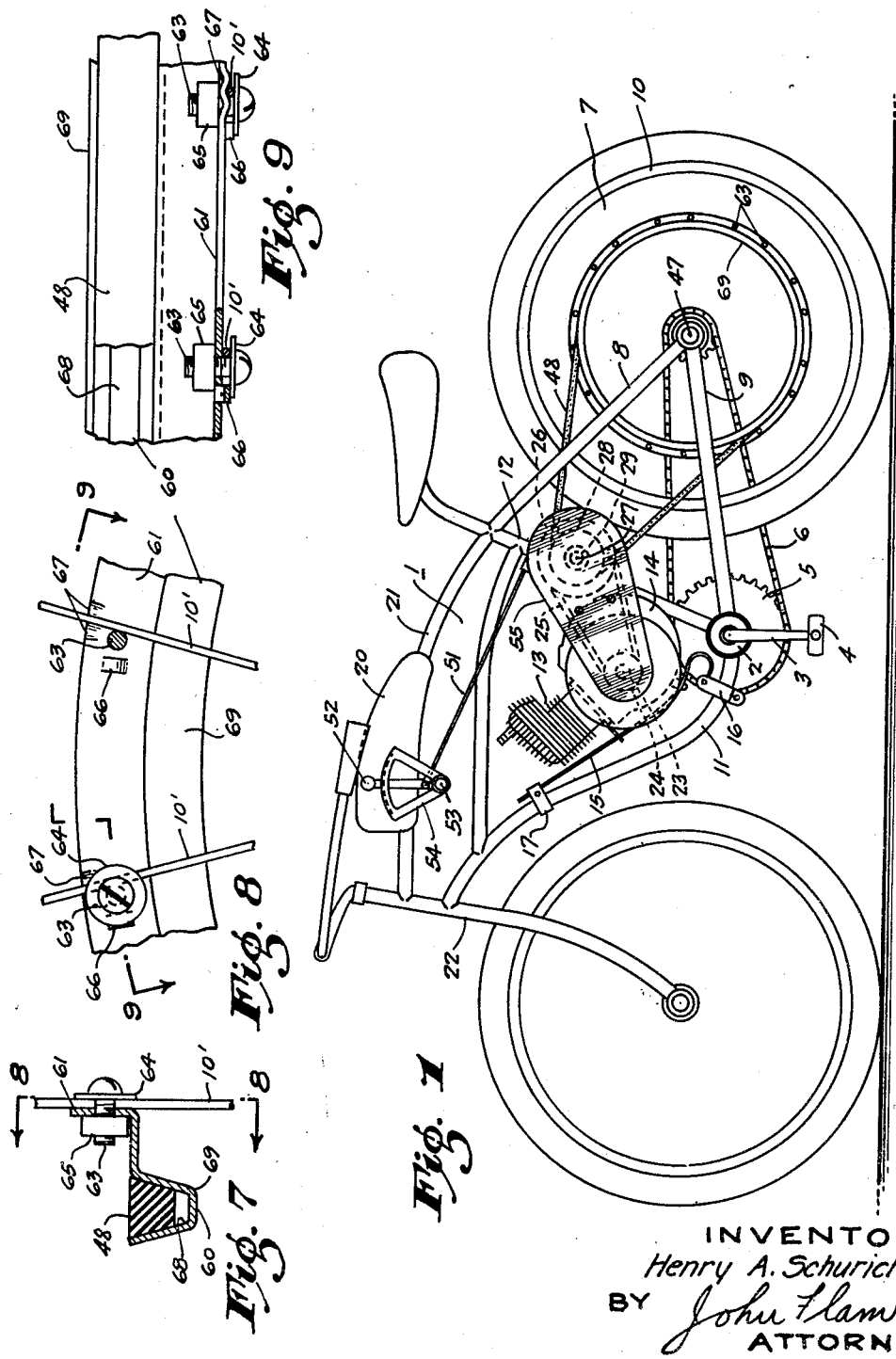
Fig. 1 is an elevation of a bicycle upon which an embodiment of the invention is installed.

In the present instance, the drive is shown as mounted on a conventional bicycle having a frame 1. As is usual, the lower portion of the frame is provided with a crank hanger 2 (Figs. 1 and 3) in which a crank 3 for operation by the pedals 4 is rotatably mounted. The crank 3 is joined to a sprocket wheel 5 of the conventional type, driving, by the aid of the sprocket chain 6, the rear wheel 7 of the bicycle.

The frame 1 is provided with the usual forked, rearwardly extending portions 8 and 9, serving to support the hub structure for the wheel 7. This hub structure is joined, as shown in Fig. 2, by a number of wire spokes 10' to the rim 10 of the wheel 7.

The frame 1 also includes, as is usual, the elements 11 and 12 forming a crotch adjacent the crank hanger 2.

It is optional with the rider of the bicycle to utilize the pedals 4 for driving the rear wheel 7, or to couple a source of motion, such as a gasoline engine, 13 to a transmission mechanism for driving this rear wheel. This engine 13 is conveniently supported upon a spring mounting in the crotch formed by the tubular frame elements 11 and 12.

Figure 2:
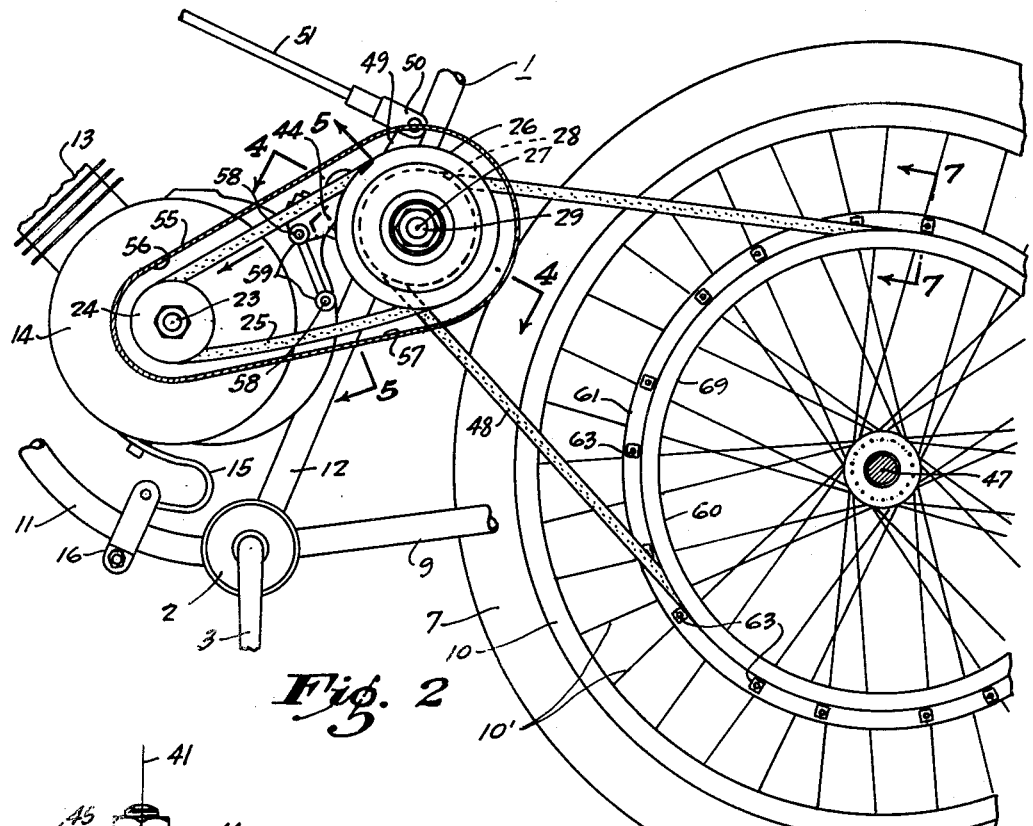
Fig. 2 is an enlarged fragmentary elevation, similar to Fig. 1, but with part of the mechanism in section.
Figure 3:
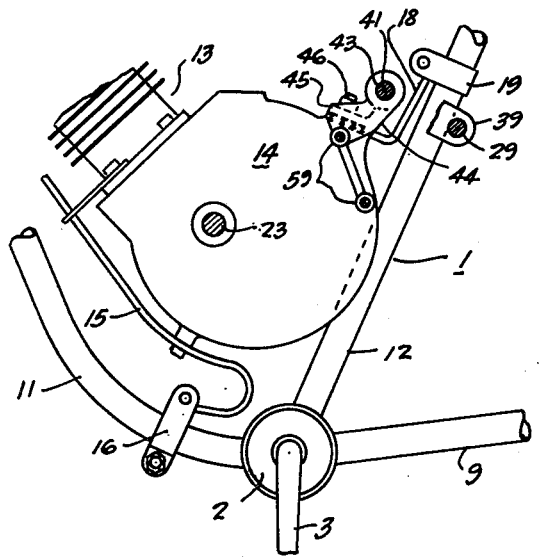
Fig. 3 is an enlarged fragmentary view, similar to Fig. 2, with part of the mechanism removed.

Thus, as shown most clearly in Figs. 1, 2, and 3, the crank case 14 of the engine 13 is shown as attached to a leaf spring structure 15. The lower end of the leaf spring structure 15 has a reverse bend therein, the extremity being accommodated in a shackle 16 carried on the tubular element 11. The upper end of the spring 15 may be slidably mounted in a shackle 17, also attached to the tubular element 11.

Figure 5:
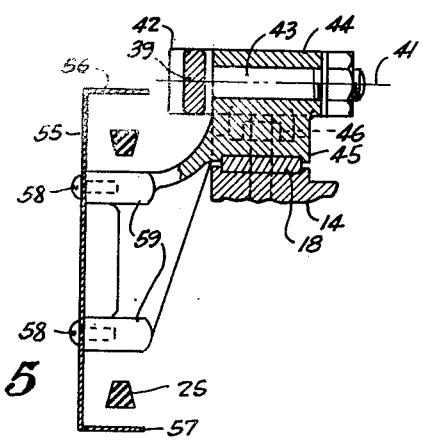

Similarly, a spring mounting 18 (Fig. 3) is shown as anchored by the aid of the shackle 19 to the tubular element 12 of frame 1. Spring mounting 18 is attached to the upper end of the crank case 14 (Fig. 5), for example, by being disposed in a shallow groove formed on the top of the crank case 14. Later on, the means for clamping this spring to the crank case 14 will be described.

The engine 13 is arranged to be supplied with fuel, such as gasoline, from a fuel tank 20 (Fig. 1) mounted conveniently upon the upper member 21 of the frame 1 adjacent the front fork 22 of the bicycle.

The engine 13, with its crank case 14, is made as narrow as practicable in order that a rider can conveniently straddle this engine mechanism while riding the vehicle.

Figure 6:
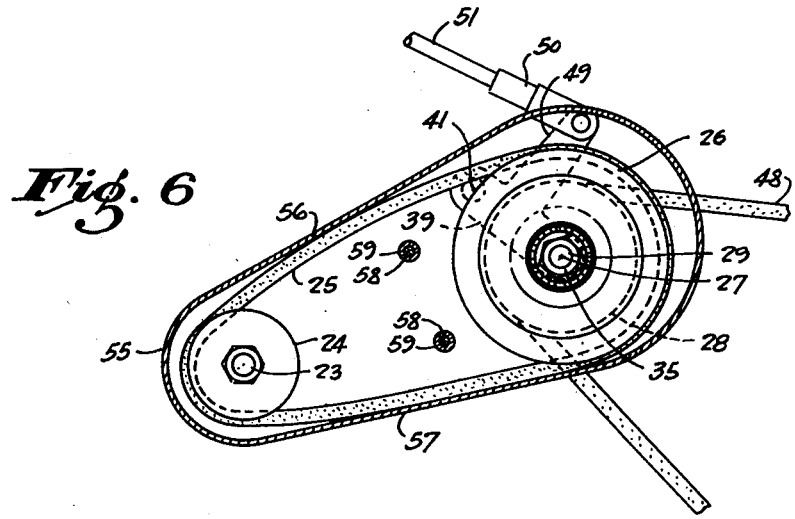
Fig. 6 is an enlarged fragmentary view of a portion of Fig. 2, illustrating a position of the drive in which the drive is disconnected.

The engine 13 serves to drive a shaft 23 (Fig. 3). Upon this shaft, as shown in Figs. 2, 3, and 6, is mounted a pulley 24. This pulley has a groove in its periphery for the accommodation of a wedge-shaped or V-shaped belt 25. The cross section of this belt is shown most effectively in Fig. 5, where the upper and lower reaches of the belt are indicated.

Figure 4:
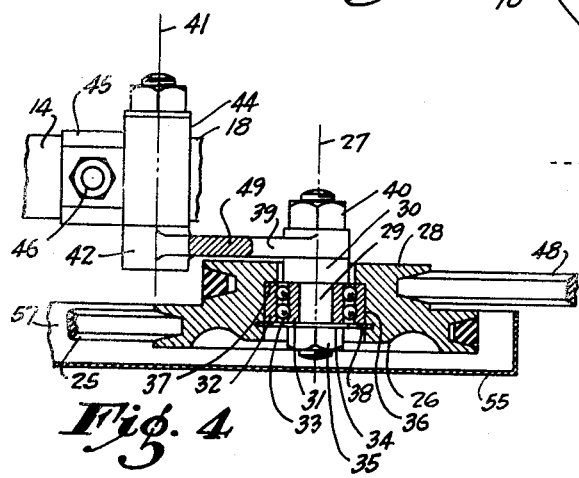
Figs. 4 and 5 are enlarged sectional views, taken along correspondingly numbered planes on Fig. 2.

The belt 25 is arranged to drive a pulley structure 26. This pulley structure has an axis of rotation 27 (Fig. 4).

In order to clutch and unclutch the drive, the center distance between axis 27 and the axis of shaft 23 is varied. When the center distance is reduced, the tension of belt 25 is reduced. On the other hand, when the center distance is increased, the belt tension is correspondingly increased, and the pulleys 24 and 26 are in driving relation to each other. The degree of tension also serves to some extent to vary the ratio of the drive, since, with lower tensions, a greater amount of belt slippage is permitted, and the ratio is correspondingly altered.

The structure of the pulley 26, together with its mounting to effect these results, may be best explained in connection with Figs. 2, 3, 4, 5, and 6.

As shown most clearly in Fig. 4, the pulley 26 has integrally joined with it a pulley 28 for driving the rear wheel 7 of the vehicle, as will be hereinafter explained. A stub shaft 29 is provided upon which the pulley 26 may be rotatably mounted. For this purpose, use is made of a ball bearing structure including the inner race 31, outer race 32, and the balls 33.

The inner race 31 is shown as accommodated between the washer 34 and an enlarged portion 30 of the stub shaft 29. The washer is held in place by the aid of the nut 35 threaded on a threaded extremity of the shaft 29.

The outer race 32 is telescoped within a central cylindrical recess 36 of pulley 26, and rests upon a shoulder 37 near the upper end of the pulley 28. This race 32 is held in place by a spring retaining ring 38 that is snapped into an appropriate groove in recess 36.

The stub shaft 29 is mounted upon a crank arm 39, as by the aid of the nut 40, which is threaded on the upper threaded extremity of stub shaft 29. This crank arm 39 is arranged to be adjusted about an axis 41 (Figs. 3, 4, 5, and 6).

In order to mount the crank arm 39 in this manner, it is provided with a hub 42 from which extends a stub shaft 43. This stub shaft 43 is rotatably supported in a bearing standard 44 that is mounted on the crank case 14. For this purpose, the bearing standard 44 has a foot member 45 (Figs. 3, 4, and 5) which extends above the end of spring 18, and which accommodates the upper surface of that spring in a groove co-operating with the groove in the crank case 14. A bolt 46 firmly holds the standard 44 and the spring 18 in place.

The axis 41 is so chosen that the movement of axis 27 toward and from the shaft 23 is made quite large for relatively small angular movements of the crank arm 39. Nevertheless, this angular movement has only a slight effect in altering the center distance between axis 27 and the axis 47 of rear wheel 7. Accordingly, clutching and unclutching the drive has no material effect upon the tension of the belt 48 which serves in a manner to be hereinafter described to drive the rear wheel 7.

Adjustment of the angular position of the crank arm 39 is accomplished by the aid of a link mechanism under the control of the rider. For this purpose, a crank arm 49 is integrally joined with crank arm 39 (Figs. 2, 4, and 6). This crank arm is pivotally connected to a link structure 51 that includes the clevis 50. Link 51 can be moved as by the aid of a manually controlled arm 52 pivoted on an axis 53. The arm 52 is joined to the link 51 above the axis 53.

In order to support the arm 52, a segment structure 54 (Fig. 1) is provided which is appropriately attached to any convenient part of the bicycle, such as the tank 20. The arm 52 can be retained in any one of a series of notches provided in the arcuate portion of the segment 54.

A belt guard 55 (Figs. 1, 2, 4, 5, and 6) of thin metal is provided for the belt 25. It is provided with opposed inwardly directed walls 56 and 57 which extend over the upper and lower reaches of the belt 25. It may be held in place as by the aid of the screws 58 (Figs. 5 and 6) that are threaded into the lugs 59 integrally formed on the standard 44.

The opposed walls 56 and 57 serve an additional important function. Reduction in the center distance between the shaft 23 and the axis 27 by rotation of the crank mechanism in a clockwise direction is intended to result in a separation of the belt 25 from both pulleys 24 and 26. But the belt 25 normally tends to assume a true circular shape; and, at diametrically opposite points of the belt, the belt would still be in light frictional contact with the pulleys 24 and 26.

In order to ensure that even this light frictional contact is obviated and to ensure that the power drive may be totally disconnected, the opposed walls 56 and 57 are so placed as to restrain the belt 25 against assuming the circular shape. Thus, in Fig. 6, the belt 25 is shown in contact with both of the walls 56 and 57 which serve to limit the bulging of the belt 25. Accordingly, the belt 25 is forced to assume a narrow, ellipse-like form, the ends of the ellipse are out of contact with the grooves in pulleys 24 and 26, and the drive is entirely disconnected.

When this is accomplished, the rider of the vehicle can propel it by foot power. However, by appropriate adjustment of the tension on belt 25, by the aid of the handle 52, the engine 13 can be gradually and easily clutched to the load, and the degree of tension will determine the degree of slippage. It is only during the starting period that this belt slippage is required. After the vehicle has been brought to its desired speed, further speed variations can be accomplished by appropriate throttle control of the gasoline engine 13.

The rear wheel drive, as heretofore stated, is accomplished by the aid of the belt 48. This belt 48 is also shown in Figs. 6, 7, and 9. It is accommodated in the groove of the pulley 28, and is similarly accommodated in a groove 68 (Fig. 7) of a pulley structure 69. This pulley structure 69 is mounted co-axially with the rear wheel axis 47 in a manner now to be described.

Pulley structure 69 (Figs. 2, 7, 8, and 9) is shown as formed of thin metal; and it may be appropriately manufactured by a stamping or spinning operation, or the like. The pulley structure 69 is conveniently made in a ring-like form having a rim 60 that defines the groove 68 for the belt 48. Integrally attached to the rim portion 60 is a flange 61 of ring form. Flange 60 is spaced from the rim portion by the cylindrical shell of the rim.

The flange 61 is arranged to be attached to the spokes 10' of the rear wheel 7. For this purpose a plurality of bolts 63, or other fastening means, may be utilized. These bolts 63 are shown, in this instance, as roundhead machine screws passing through the flange 61. Each of the screws 63 is provided with a washer 64 that is intended to overlie the corresponding spoke 10', as shown most clearly in Figs. 8 and 9. Each screw is, furthermore, provided with a nut 65 for tightening the washer 64 over the spoke.

In order to prevent cocking of the washer 64 on the bolt 63, bosses 66 are provided on the flange 60 adjacent each of the apertures through which the bolts 63 pass. These bosses 66 may be appropriately struck up out of the metal that forms flange 60.

Furthermore, in order further to restrain angular movement of the pulley structure 69 with respect to the rear wheel 7, the outer edge of the flange 61 is provided with fluted portions 67. These fluted portions provide relatively shallow recesses or slots for the spokes 10', as indicated most clearly in the right-hand portion of Fig. 9.

The mode of operation of the device may now be summarized. If it is desired to utilize the pedals 4 for driving the vehicle, the link 51 is moved toward the right, as viewed in Fig. 1, by the aid of the handle 52, until the belt 25 is entirely uncoupled from the pulleys 24 and 26. In this position, even with the engine 13 in operation, no power drive is effected for the vehicle.

Now, in order to clutch the engine 13 to the vehicle, the handle 52 is gradually moved in a counter-clockwise direction, pulling link 51 toward the left and increasing the center distance between shaft 23 and axis 27. This can be done so that the engine 13 is easily and smoothly caused to pick up its load. After the load is picked up, some speed variation can be provided by adjusting the tension of belt 25. Preferably, however, the speed variations can be accomplished by appropriate throttle control of the engine 13.

The variation in the position of axis 27 has little effect upon the center distance between the axis 27 and axis 47. Accordingly, the belt 48 remains at substantially uniform driving tension.

The process of de-clutching is obvious from the foregoing. The lever 52 is moved in a clockwise direction until the position of Fig. 6 is attained.

The belt 48 has an axis extending between the centers of pulleys 69 and 26, and belt 25 has an axis extending between the centers of pulleys 26 and 24.

The inventor claims:

1. A motor bicycle comprising a resiliently mounted motor capable of moving with respect to the frame of the bicycle, a transmission comprising a driven belt adapted to be driven by a pulley on the motor, a driving belt adapted to drive a wheel of the bicycle, and a double pulley for connecting the belts pivotally mounted on the motor, the location of the pivot of the double pulley being about in line with an extension of the axis of the driving belt whereby to minimize the effect upon the tension thereof of the pivotal movement, and the relative movement of engine and frame, and means to pivot the double pulley by small steps toward the engine pulley to effect a change of speed, whereby the driving belt is kept in extended position as the distance between the motor pulley and the double pulley is reduced.

2. A motor bicycle comprising a resiliently mounted motor capable of moving with respect to the frame of the bicycle, a driven belt adapted to be driven by a pulley on the motor, a driving belt adapted to drive a wheel of the bicycle, and a double pulley for connecting the belts pivotally mounted upon the motor, the location of the pivot of the double pulley being about in line with an extension of the axis of the driving belt whereby to minimize the effect of the movement thereof upon the tension of the driving belt, and means to move the double pulley toward the motor pulley to change speed, whereby the driving belt is kept in extended position as the distance between the motor pulley and the double pulley is reduced.

3. A motor bicycle comprising a motor, a driven belt adapted to be driven by a pulley on the motor, a driving belt adapted to drive a wheel of the bicycle, a double pulley for connecting the belts mounted upon the bicycle upon a crank having a fixed pivot about in line with an extension of the axis of the driving belt, means to move the double pulley toward the motor pulley to change speed, and means to maintain the driving belt in extended position as the pulley is so moved.

4. A motor bicycle comprising a motor, a driven belt adapted to be driven by a pulley on the motor, a driving belt adapted to drive a wheel of the bicycle, a double pulley for connecting the belts mounted on an arm having a fixed pivot about in line with the extended axis of said driving belt, and means to move the arm about said fixed pivot.

5. A belt drive for a motorcycle including a plurality of belts connecting a motor to a driven wheel through a plurality of pivotally mounted, axially aligned, interconnected pulleys, the pivot upon which said pulleys are mounted being about in line with the axis of one of said belts and outside of said last-mentioned belt, and a guard enclosing the motor driven belt having flat members extending parallel to the reaches of the said motor-driven belt at such distance therefrom that the belt, upon being loosened by pivoting of the pulleys, engages said members.

6. A belt drive for a motorcycle including a plurality of belts connecting a motor to a driven wheel through a plurality of pivotally mounted, axially aligned, interconnected pulleys, the pivot upon which said pulleys are mounted being about in line with the axis of one of said belts and outside of said last-mentioned belt, and guard means having flanges close to the motor-driven belt which reduce the outward movement of the reaches of the motor-driven belt when release pivoting of the interconnected pulleys reduces the tension thereon, said guard enclosing said pivoted pulleys and the pivot thereof.

7. A belt drive for a motorcycle including a plurality of belts connecting a motor to a driven wheel through a plurality of pulleys mounted in triangular relation to each other, one of said pulleys being mounted on a pivoted arm and being double to receive both belts, the individual pulleys of said double pulley being of different size, and the pivot upon which said double pulleys are mounted being about in line with the axis of one of said belts and outside of said last-mentioned belt and the line connecting said pivot and the axis of the double pulleys being about transverse to the axis of the other belt, and lever means to set the pivoted arm in selected position.

HENRY A. SCHURICHT.

REFERENCES CITED

The following references are of record in the file of this patent:

UNITED STATES PATENTS

| Number | Name | Date |
|---|---|---|
| 355,555 | Radford | Jan. 4, 1887 |
| 718,094 | Clement | Jan. 13, 1903 |
| 729,197 | Mathieu | May 26, 1903 |
| 833,979 | Sandell | Oct. 23, 1906 |
| 1,978,526 | Eppler, Jr. | Oct. 30, 1934 |
| 2,047,362 | Dunford | July 14, 1936 |
| 2,156,701 | Petersen | May 2, 1939 |